United States Patent [19]

Ruggiero

[11] Patent Number: 5,241,620
[45] Date of Patent: Aug. 31, 1993

[54] EMBEDDING NEURAL NETWORKS INTO SPREADSHEET APPLICATIONS

[75] Inventor: Murray Ruggiero, New Haven, Conn.

[73] Assignee: Promised Land Technologies, Inc., New Haven, Conn.

[21] Appl. No.: 637,301

[22] Filed: Jan. 3, 1991

[51] Int. Cl.$^5$ ............................................. G06F 15/18
[52] U.S. Cl. ...................................................... 395/22
[58] Field of Search ........................... 395/22; 364/419

[56] References Cited

U.S. PATENT DOCUMENTS 5,142,612  8/1992  Skeirik ................................. 395/22
5,142,665  8/1992  Bigus .................................... 395/22

OTHER PUBLICATIONS

Towards a Rapid Prototyping Environment for Interface Design: Desirable Features Suggested by the Electronic Spreadsheet; Hewett Proceedings 5th Conference on British . . . ; 1989; pp. 304–314.
Using an Electronic Spreadsheet Simulator to Teach Neural Modeling of Visual Phenomena; Hewett; May 1985.
Using an Electronic Spreadsheet Simulator . . . ; T. T. Hewett; Collegiate Microcomputer; vol. IV, No. 2; May 1986; pp. 141–151.

Primary Examiner—Allen R. MacDonald
Attorney, Agent, or Firm—Bachman & LaPointe

[57] ABSTRACT

The present invention relates to a method of embedding a neural network into an application program such as a spreadsheet program. The method comprises providing an application program in which information is stored in rows and columns or a database containing fields and records and embedding a neural network in the application program or database using the stored information. The embedding step includes allocating unused memory in the application program and creating both a neural network engine and an application interface structure from the unused memory. Once the neural network engine and an application interface structure have been created, the neural network may be trained using variable numerical and symbolic data stored within the application program. Once training is completed, the neural network is ready for use, merely by using a recall function built into the applications program.

13 Claims, 4 Drawing Sheets

CREATE THE NETWORK IN MEMORY

FREE UNUSED MEMORY FOR THE NETWORK SIZE SPECIFIED BY THE MENU COMMANDS

↓

CREATE THE NEURAL NETWORK STRUCTURE FROM THE FREED MEMORY

↓

CREATE THE APPLICATION INTERFACE STRUCTURE FROM THE FREED MEMORY

↓

THE NEURAL NETWORK HAS BEEN CREATED IN MEMORY AND IS READY TO TRAIN

EMBEDDING NEURAL NETWORKS INTO SPREADSHEET APPLICATIONS

BACKGROUND OF THE INVENTION

The present invention relates to computer systems and more particularly is concerned with the application of neural networks to applications such as spreadsheet programs.

Neural networks are powerful information processors. They typically include a plurality of processing elements called neurons arranged in layers. They further include interconnections between the units of successive layers. A network has an input layer, an output layer, and one or more "hidden" layers in between. The hidden layer or layers are necessary to allow solutions of non-linear problems. Each unit functions in some ways analogous to a biological neuron. A unit is capable of generating an output signal which is determined by the weighted sum of input signals it receives and an activation function specific to that unit. A unit is provided with inputs, either from outside the network or from other units, and uses these to compute a linear or non-linear output. The unit's output goes either to other units in subsequent layers or to outside the network. The input signals to each unit are weighted by factors derived in a learning process.

When the weight and activation function factors have been set to correct levels, a complex stimulus pattern at the input layer successively propagates between the hidden layers, to result in a simpler output pattern, such as only one output layer unit having a significantly strong output. The network is "taught" by feeding it a succession of input patterns and corresponding expected output patterns. The network "learns" by measuring the difference at each output unit between the expected output pattern and the pattern that it just produced. Having done this, the internal weights and activation functions are modified by a learning algorithm to provide an output pattern which most closely approximates the expected output pattern, while minimizing the error over the spectrum of input patterns. Neural network learning is an iterative process involving multiple lessons. Neural networks have the ability to process information in the presence of noisy or incomplete data and yet still generalize to the correct solution.

Neural networks have many strong points. For example, they train by example and will adjust dynamically to new information. They also generalize from sets of specific examples and are tolerant to "noisy" or random inputs. There is a gradual degradation in performance when a neural expert is asked to solve a problem outside of its experience. New knowledge in the form of new examples increases learning time minimally. In short, the strong points of neural networks are the creation of expert systems and the ability to produce forecasts using historical data.

Despite all of these advantages, there are also disadvantages attendant to neural networks. For example, a neural network cannot explain itself in the form of real rules. Additionally, it may get stuck in a local minimum giving a user a good answer that is not necessarily the best answer. Still further, data must often be pre-processed in order for the neural network to effectively learn from it. Training a neural network with a large data set may take days or even weeks.

An alternative approach to artificial intelligence is rule based expert systems. A rule based expert system is composed of two major components. One component is the inference engine which is a set of "if/then" rules that processes inputs in a sophisticated manner. The other component is the rules or knowledge base. The inference engine processes routines depending on the value of the inputted data. Rules are either stated by an expert where developed from data using an algorithm such as ID3.

Highly effective expert systems can be developed if the rules governing the problem are already known. Additionally, a rule based expert system is capable of explaining how it arrives and then answers. The disadvantages however are that rule based systems generalize poorly. Generalization can be particularly poor if the rules have been generated by an algorithm such as ID3. Additionally, using an expert to generate rules is time consuming and expensive. If knowledge changes are added, an expert is needed to generate new rules. Another disadvantage of expert systems is that the human experts sometimes develop incorrect rules as a result of intuitive work.

Neither the neural network nor the rule-based paradigms are particularly good at conventional, number crunching or procedural algorithms. It is difficult to test various "what if" scenarios quickly in any of the products currently on the market. Neither method has a standard user-friendly interface to facilitate easy learning and implementation. To date, none of the products on the market mix the neural and rule-based technologies in the same environment. Currently, it is necessary to purchase two separate products, each with its own learning curve.

Spreadsheets are well known software application programs used in connection with microcomputers. A spreadsheet program is essentially a large electronic piece of paper that an end-user can work with in a variety of ways.

The screen display of a spreadsheet package is comprised of two main parts: the control panel and the spreadsheet window. The control panel is the area of the screen in which the command menus are displayed. These menus are the primary way to issue instructions to the program.

The spreadsheet window is arranged in columns and rows of cells in which to enter data. The most common spreadsheet arrangement is 256 lettered columns by 8192 numbered rows. Using this configuration, spreadsheet cell addresses range from "A1" to "IV 8192". Labels, numbers or formulas may be entered anywhere in the spreadsheet to build customized applications.

Another way to issue command instructions is to use the built-in functions of the spreadsheet. These built-in functions may be entered into any cell and are treated as formulas.

The recalculation mechanism is an important part of any spreadsheet. The values of formulas often depend upon the values of formulas or numbers in other cells. Thus, the values of formulas must be updated after every entry of a number or formula. Formulas are updated in a natural order of their dependencies.

Integrated spreadsheet packages combine spreadsheets, database management and graphics into a single environment. Database commands are issued using either menu commands or built-in functions. Graphic commands are issued using the menu.

To date, there is no spreadsheet application program available which incorporates a neural network. It is possible to develop an expert system using the macro language of a spreadsheet.

Accordingly, it is an object of the present invention to provide a method for embedding a neural network and expert system into an application program.

It is a further object of the present invention to provide a method as above in which information stored within an application program can be used to train the neural network expert system.

It is still a further object of the present invention to provide a method for embedding a neural network and expert system into a spreadsheet program.

These and other objects and advantages will become more clear from the following description and drawings in which like reference numerals depict like elements.

SUMMARY OF THE INVENTION

The foregoing objects and advantages are obtained by the method of the present invention. The method of the present invention for embedding a neural network into an application program broadly comprises providing an application program in which information is stored in rows and columns or a database in which information is stored in the form of records and fields and embedding a neural network in said application program or database using said stored information. The embedding step of the present invention comprises allocating or freeing unused memory in the application program and creating both a neural network engine and an application interface structure from this memory. Once the neural network engine and an application interface structure have been created, the neural network may be trained using variable numeric and symbolic data stored within the application program.

Prior to training, the numeric variable data is prepared by storing in the interface structure, for each piece of numeric data, a maximum possible value, a minimum possible value, a column location, a starting row location, information on the type of variable, and the number of training patterns. Additionally, variable symbolic data is prepared in a unique manner by storing in the interface structure for each piece of symbolic data, an address for the variable's symbol table, a symbol type, a column location, a starting row location, information on the type of variable, and the number of desired training patterns. Thereafter, training is effected by scaling all data to values between 0.0 and 1.0 and performing one forward pass and one backward pass through the neural network for a desired number of training patterns.

Once the system has been trained, the neural network expertise may be recalled at any time, a desired number of inputs may be inserted into the neural network and a desired number of outputs can be computed by the neural network. As will be seen from the following description, the method of the present invention uniquely processes symbolic data as well as numeric data.

The method of the present invention may be employed in a wide variety of application programs. By embedding the neural network into the application program itself, a number of distinct advantages can be obtained.

DETAILED DESCRIPTION

The neural network of the present invention will now be described with reference to the Figures. While, it will be described in the context of a spreadsheet applications program, it should be recognized that the techniques of the present invention have utility with a wide range of application programs.

In accordance with the present invention, the neural network can be embedded into the applications program. This may be accomplished in a number of different ways. For example, the neural network may be a separate program which runs simultaneously with the application program or alternatively may be a module within the applications program.

Figure 1:
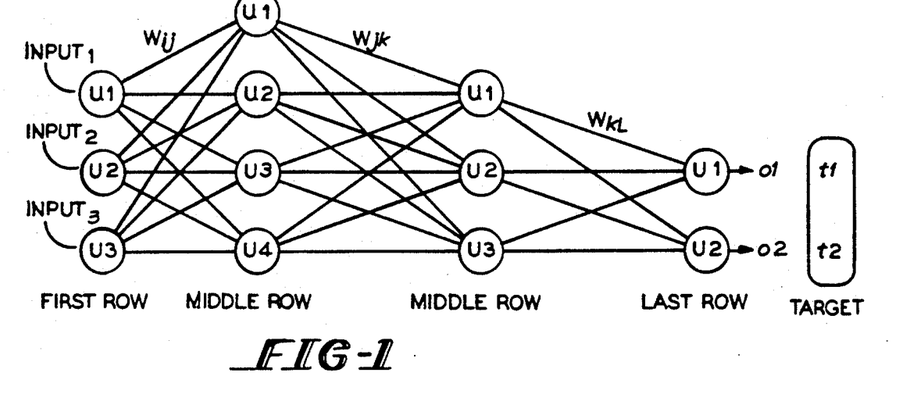
FIG. 1 is a diagram illustrating a neural network structure.

The neural network may have any desired data structure. FIG. 1 illustrates a standard back propagation neural network structure which may be used with the present invention. The network has three inputs nodes (first row), two output nodes (last row) and two hidden layers (middle rows). The first hidden layer has four hidden nodes and the second hidden layer has three hidden nodes.

The equations for training the neural network may be as follows:

(a) for the first row:

$$O_i = \text{input}_i \quad (1)$$

wherein $O_i$ = PE value after sigmoidal transformation;

(b) for the first middle row:

$$U_j = (\Sigma_i w_{ij} o_i) + \text{bias}_j \quad (2)$$

$$o_j = F(U_j) \quad (3)$$

$$\epsilon_j = F'(U_j)(\Sigma_k w_{jk} \epsilon_k) \quad (4)$$

$$\Delta w_{ij} = \beta o_i \epsilon_j \quad (5)$$

$$\Delta \text{bias}_j = \beta \epsilon_j \quad (6)$$

wherein
  $\epsilon$ = proportional to $-d\text{Error}/du$
  $\beta$ = constant between 0 and 1
  U = PE value before sigmoidal transformation
  O = PE value after sigmoidal transformation
  66 = adjustment during training
  F = sigmoidal transform
  F' = first derivative of F
  W = link weight between two PE's (c) for the second middle row:

$$U_k = (\epsilon_j w_{jk} O_j) + \text{bias}_k \quad (7)$$

$$O_k = F(U_k) \quad (8)$$

$$\epsilon_k = F'(u_k)(\Sigma_j w_{kl} \epsilon_l) \quad (9)$$

$$\Delta w_{jk} = \beta o_j \epsilon_k + \alpha \Delta w_{old} \quad (10)$$

$$\Delta \text{bias}_k = \beta \epsilon_k \quad (11)$$

where $\epsilon$, $\beta$, u, o, $\Delta$, F, F' and W are as above,
$\alpha$ = moment
$\Delta w_{old}$ = old weights (d) for last row:

$$u_l = (\Sigma_k w_{kl} O_k) + \text{bias}_l \quad (12)$$

$$O_l = F(u_l) \quad (13)$$

$$\epsilon_l = F'(U_j)(\dagger_l - O_l) \quad (14)$$

$$\Delta w_k = \beta O_k \epsilon_l + \alpha \Delta w_{old} \quad (15)$$

$$\Delta \text{bias}_l = \beta \epsilon_l \quad (16)$$

where U, $\beta$, $\epsilon$, o, $\Delta$, F, F', $\alpha$, $\Delta w_{old}$ and w are as above and $\dagger_1$ and $\dagger_2$ are targets.

Training is made up of three steps:
(1) forward pass
(2) error calculation
(3) weight adjustment.

During the forward pass, values are applied to the input nodes U1, U2 and U3. These inputs are then multiplied by the weight $w_{ij}$ connected to all nodes in the second layer. These values are summed up for each node. For each node, a sigmoid transform is applied to the sum for that node. The resulting values are then used as the input to the next layer. This is repeated until the values are determined for all outputs.

The error calculation step involves a backward pass through the network and is performed as follows using equations (4), (9) and (14). For each output, the error for the output layer (last row) is equal to the simple error (i.e., $\dagger_1 - O_l$) times the first derivative of the sigmoid transformation. The error for the middle rows output is calculated by the error of the previous layer summed by all the weights connected to each node. This sum then has the first derivative of the sigmoid applied for each node. This process is repeated until the input layer is reached.

The weights are then adjusted using equations (5), (6), (10), (11), (15) and (16). The error calculated respectively for each layer is multiplied by the output of that layer. A scaling factor called the learning rate is used to cause the network to relate the learning of the previous patterns. Another factor, momentum, is also used.

These three steps are repeated until the error at the output node reaches a desired value. It should of course be recognized that virtually any neural network structure can be adapted to the present invention.

As will be discussed in more detail hereinafter, the present invention uses entries in the applications program as the training data for the neural network whose engine has full access to all the formulas, data and range name tables stored in and the built-in functions of the applications program including the recalculation mechanism. The method of the present invention allows the user to define the inputs and the outputs and enables the neural network to present the output to the applications program in its normal display format. Additionally, the neural network engine handles all training, querying and internal data manipulation.

Figure 2:
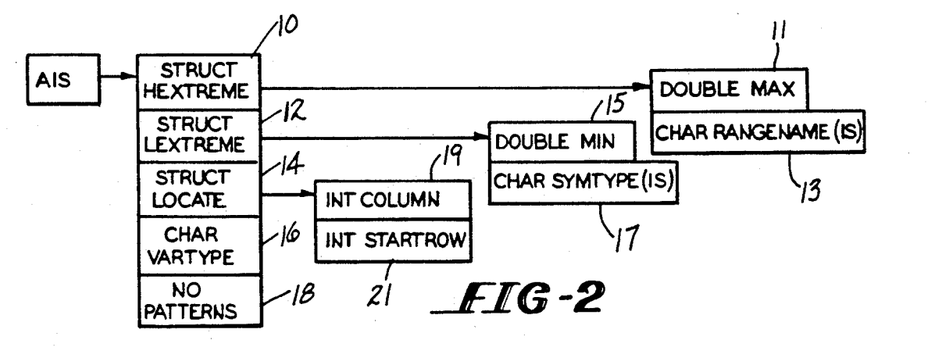
FIG. 2 is a diagram illustrating the structure of an application interface in accordance with the present invention.

In accordance with the present invention, the neural network to be embedded includes as an integral component an application interface system for translating data in the application program into a form that is usable by the neural network and for translating the output of the network back into a form usable by the application program. The interface system is unique in that it converts symbolic data such as alphanumeric characters into numeric data. The interface system is further unique in that it stores the addresses of all application data to be processed by the neural network. If the application program is in the form of a spreadsheet, addresses are stored in the form of rows and columns. If the application program is a database, the addresses are stored in the form of records and fields. FIG. 2 illustrates one type of interface structure.

As can be seen from this Figure, the interface system could have five fields. They could include: (1) struct hextreme 10; (2) struct lextreme 12; (3) struct locate 14; (4) char var-type 16; and (5) no-patterns 18. The first field 10, struct hextreme, may be the "high extreme" structure containing two fields. Field 11, "max" may be the highest possible value for the variable stored there if the variable is numeric. Field 13, "range name" may be the spreadsheet address of a symbol table of the variable stored within the application program if the variable is symbolic. The symbol table may be user or program defined.

The second field 12, struct lextreme, maybe a "low extreme" structure containing two fields. Field 15, "min", may be the lowest possible value for the variable stored there if the variable is numeric. Field 17, "sym type", may be the type of symbol stored there if the variable is symbolic.

The third field 14, "struct locate" may also be a structure containing two fields. The first field 19 may be the column number of the spreadsheet address of a variable. Each variable corresponds to a single column of three or more rows in the spreadsheet. The second field 21 may be the first row in the spreadsheet address of a variable.

The fourth field 16, "char vartype", may store the variable type. The fifth field 18, "no-patterns", may store the number of patterns on which the neural network is to be trained.

Figure 3:
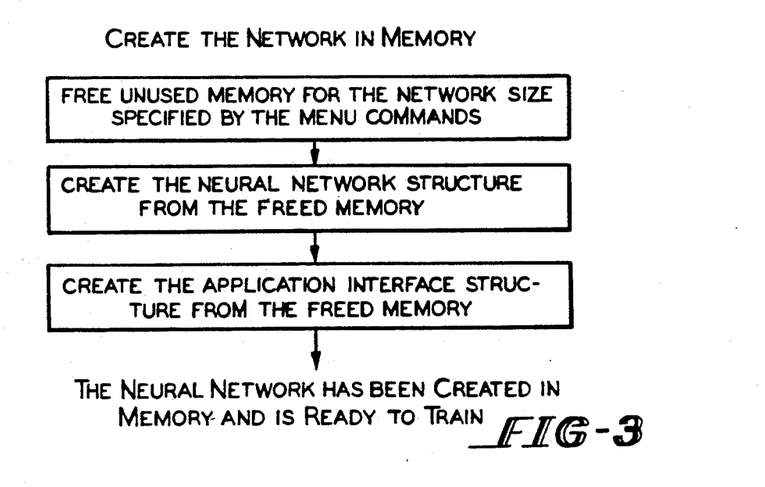
FIG. 3 is a flowchart illustrating how to create a neural network.

The neural network to be embedded within the applications program may be created as shown in FIG. 3 by entering appropriate commands which: (1) allocate or free unused memory using the standard dynamic memory allocation routines of the resident language and operating system; and (2) create the neural network structure including the neural network engine and the interface structure with the freed memory using the standard routines of the program language. The interface structure may be similar to that shown in FIG. 2.

When the neural network is created, a user has the freedom to specify any number of inputs and outputs, the numbers to be accorded to the inputs and the ranges for each input. Each input can be defined in the network by writing one input per column or field, while outputs of the network are written to remaining columns or fields, one output per column or field. Each pattern maybe on a different row. Network outputs may be displayed as either symbols or numbers.

Figure 4:
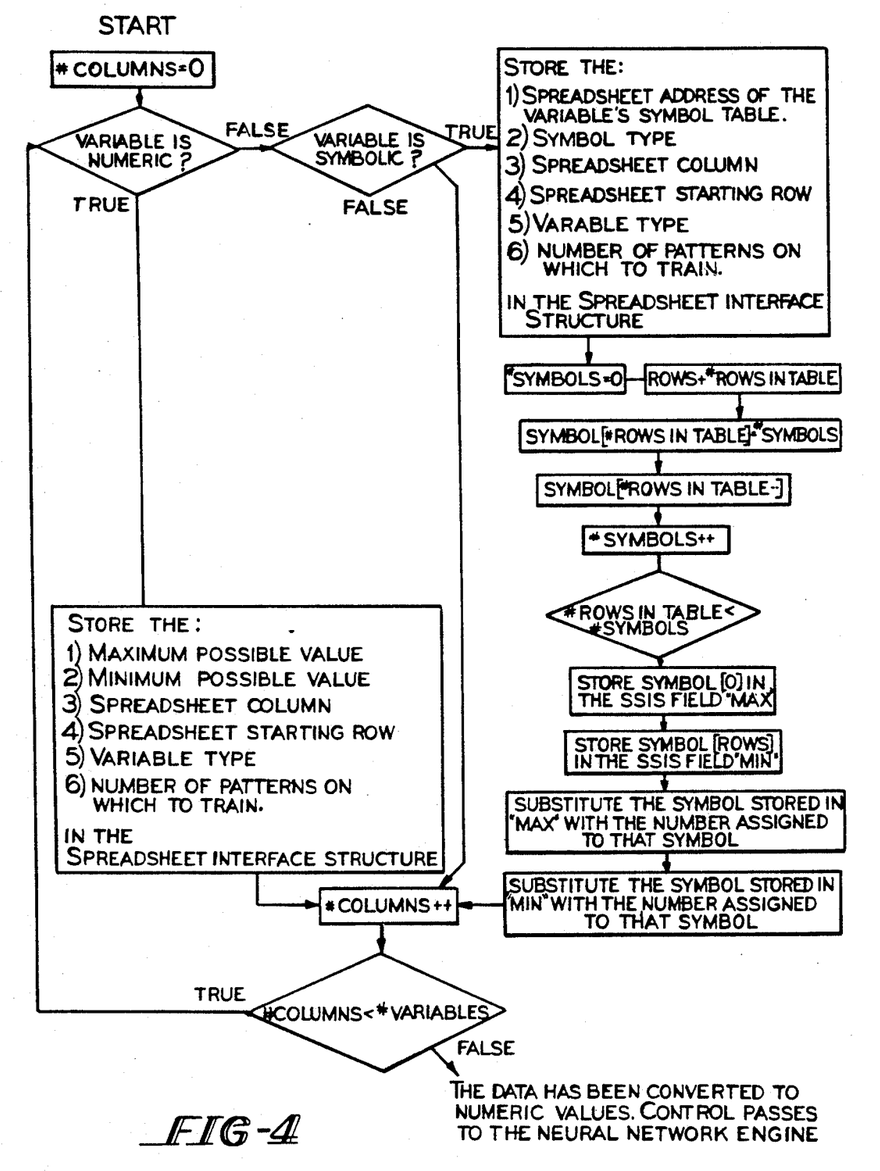
FIG. 4 is a flowchart illustrating how spreadsheet or database variables are prepared for training by the neural network.

One of the principal advantages of the neural network design of the present invention is that data already present in the application program may be used to train the neural network. To train the network, the technique shown in FIG. 4 may be utilized. In this approach, every data record used for network training is converted into numerical values. This means for every input and output variable in the network the following events take place: (1) if the variable is numeric, the "max", "min", "column", "start row", "var type" and "no-patterns" are stored in the interface structure; (2) if the variable is symbolic, the "range name" (an area of columns and rows), "sym-type", "column", "start row", "var type" and "no-patterns" are stored in the interface structure; (3) a numeric value is assigned to each symbol in any symbol table; (4) the numerical values of the first and last number assigned by the interface structure for the symbol of each symbol table are stored in the interface structure in "min" and "max"; and (5) the number assigned to a symbol is substituted for the symbolic value from the symbol table.

Neural networks are only capable of processing numeric data that is within the range 0.0 to 1.0. Thus, the aforementioned numeric data must be scaled so that it falls within this range. The neural network engine uses the interface structure to find data within the spreadsheet. The data is then converted one record at a time to numbers within the 0.0 to 1.0 domain.

Figure 5:
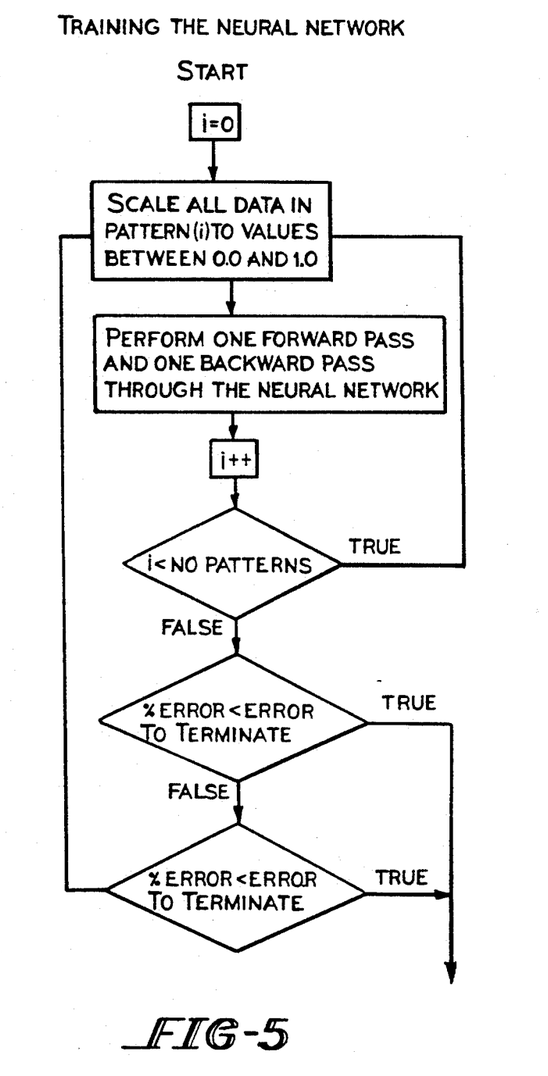
FIG. 5 is a flowchart illustrating the training of the neural network.

The neural network as shown in FIG. 5 uses the converted data for one training cycle that includes a forward pass and a backward pass through the neural network. The process is repeated for a number of patterns until the neural network is trained to within a specified percent of error. One advantage to the present invention is that the weights used in the neural network may be adjusted during training based upon error rate and outputted weight matrices. The effect of this is to boost the network's learning process. Another advantage is that one can update weights in the neural network by reading values stored within an application program memory. This further boosts the network's learning process.

After the neural network is trained, all symbolic variables are converted from their numeric equivalents back into symbols. The training process is now complete.

In the method described above, data is read from the application program each time that record is trained or recalled. That data which is symbolic is converted to numbers. After training or recall, the numbers relating to symbols are converted back. If desired, the following alternative approach may be used. Data may be read off the application program and stored in the form of all necessary conversions. That is, all conversions which are necessary such as converting symbols to numbers and scaling numbers into the 0 to 1 domain may be performed on the data and stored in a matrix in the memory. Using this approach, symbols which are converted to numbers are not written back to the spreadsheet. This results in the elimination of the need to convert symbols to numbers before training and converting numbers back to symbols after training.

Figure 6:
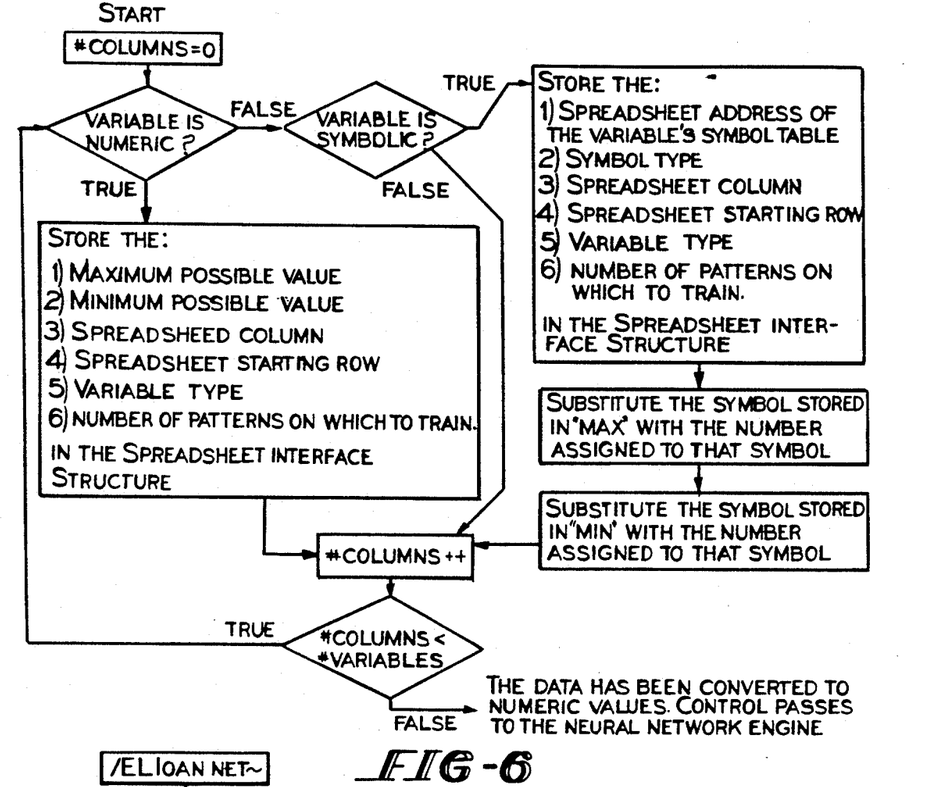
FIG. 6 is a flowchart illustrating the preparation of data for training by the neural network.

When one wants to use the trained network, it may be recalled using appropriate menu commands in either the application or operating program. After recall is set up it will automatically update when data in a specified area i.e., groups of cells or ranges, in the application program, or the size of the area in the application program, is modified. The recall process shown in FIG. 6 is similar to training except that the neural network engine executes only a forward pass through the network. Each network variable is represented by a column or field in the application's data.

For each column specified in a recall function, the max, mins, symbol table and symbol type are taken from values calculated and stored in memory. The column, starting row, and no. of patterns are stored in the interface structure if the column or field is numeric; and if the column is symbolic; (a) the data type, column, starting row, no. of patterns, address of the symbol table and the symbol type are stored in the interface structure, and (b) the symbolic value from the symbol table with the number assigned to that symbol is substituted in the application. The symbol table(s) have been previously defined in the training procedure. The same table could be placed on different worksheets to be used with recall. All columns in the record have now been converted to numeric values.

The neural network engine uses the application interface data structure to find data within the application. The data is then converted, if desired one record at a time, to numbers in the range 0.0 to 1.0. The converted record is used for a single forward pass through the neural network.

The forward pass produces network outputs in the domain 0.0 to 1.0. If desired, the outputs can be converted into unscaled numeric values and written to the application. Symbolic data can be converted from numeric to symbolic by the application interface code and written back to the application.

Figure 7:
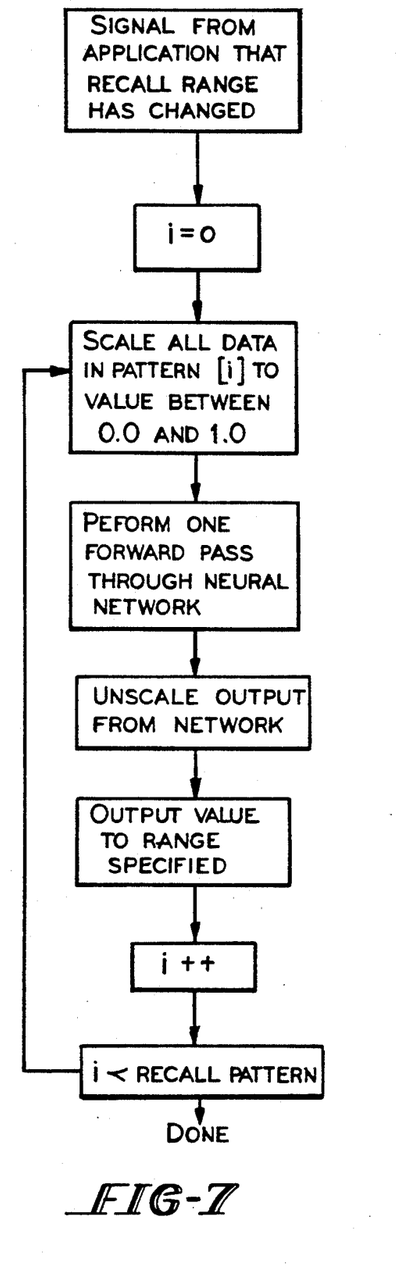
FIG. 7 is a flowchart illustrating the manner in which the network's expertise is recalled.

As shown in FIG. 7, if a user changes an input or inputs in the area of the application program defined by the interface structure, the recall step is automatically repeated and another forward pass through the network occurs. The recall step is also automatically repeated when a change in the size of the specified area in the application program defined by the interface structure occurs.

There are a number of common neural network problems that are solved by embedding the neural network into the application program. For example, if insufficient hidden nodes are used, the neural network is forced to generalize. Such a network may not train down to an acceptable rate of error. As the number of hidden nodes is increased, the network's error rate on training data (data that the network has never been trained on) decreases proportionally.

With excessive nodes, the network is highly accurate with the training data. In time however, the network begins to treat everything as a special case. The problem of excessive nodes can be solved by exporting a table of the network's connection weights using the application command languages; examining the weight table; and if all connection weights to hidden nodes are close to zero, change them to zero. Thereafter, the changed weight matrix may be imported back into the neural network using application menu commands and training of the network can be continued. By changing all connection weights to a hidden node to zero, the node is removed from the network.

It has been found that patterns shown to the network earlier have more importance then those shown later. Thus, it is best to randomize training cases. This can be done by an application macro that sorts on a column that contains a random function for each record. The neural network may then be trained on the randomized training data.

Training a neural network with a large training data set may take days or even weeks to complete. To shorten training times, one can create a subset of the training data using an application's data sort menu command. For example, the training data can be sorted in the ascending order of the output columns. The records containing the maximum, minimum and midpoint values can be copied to another part of the application for future reference. Thereafter, the training data can be sorted in the ascending order of the input columns and additional records containing the maximum, minimum and midpoint values can be copied to another part of the application. The network is then trained to a reasonable low percentage of error using the training data subset. As the error drops, more of the organizational records can be added.

When the learning rate of the network is too high, connection weight explosion may occur. This causes the network's connection weights to fall on the horizontal tangents of the sigmoid curve, rapidly approaching positive or negative infinity. The network stops learning under these conditions. There are two techniques to avoid weight explosion. One is to save the latest non-explosion weight template. The other is to export the weight matrix, modify the weight matrix by adjusting "exploded" weight back to within a normal value range, import the adjust matrix back into the neural network and continue training.

As previously discussed, an excess of hidden nodes may cause the network to overspecialize. As the network trains, the solution space becomes increasingly specific. At some point, the network's performance on test data begins to worsen. To solve this problem, break your training data into two sets. Use one for training and the other for testing.

The network is overtrained when the error on the test data begins to increase. To prevent overtraining, save the weights during the learning process. If the error on both training and testing data is decreasing, then update the copy of the weights and continue training. If the percentage error increases on the testing data, load the last good set of weights back into the network and stop training.

Overtraining can be prevented by using an applications program macro. For example, overtraining can be prevented by using a recall function from the neural network in the application program on the testing data. The matrix subtraction function could be used to create an error matrix and an average spreadsheet function can be used on these matrices. If the error decreases for the test data, the weights are copied to a "goodcopy" range. If the error starts to increase, "goodcopy" is imported into the network and learning is stopped.

After training the network, it can be tested with data for which answers already exist but was not used in training. By performing a matrix substraction on the target outputs and predicted values, one can verify the network.

EXAMPLE

Figure 8:
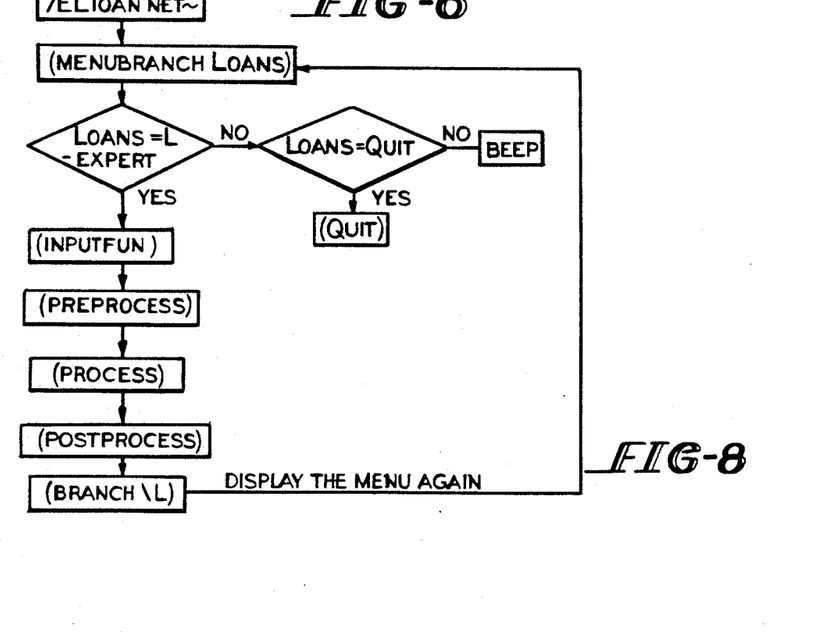
FIG. 8 is a flowchart illustrating an example of the neural network being used to process loan requests.

Now that there is an understanding of the present invention, its principles can be better understood with reference to FIG. 8 by the following example. For our example, we pick an expert loan risk evaluator in which a number of input parameters are used to predict five levels of loan risk. These risk levels correspond to various types of people for whom you might be asked about approving a loan. Back propagation is used to create this loan evaluator. Two features are added using conventional programming and rule-based technologies to filter out erroneous data. The first feature is a macro that uses the output of the network to show a screen using the built-in go to function command of the spreadsheet. The second feature is a rule based preprocessor that filters the input that the network will be queried on. Additionally, the output of the network is used to allow a user of the system to continue the evaluation using the knowledge contained in the system.

The following eleven inputs are used to set up the system: (1) years at present address; (2) years at previous address; (3) payment to income ratio (monthly salary/monthly payments); (4) rent or own home; (5) years with employer; (6) years with previous employer; (7) number of dependents; (8) U.S. citizen; (9) monthly salary; (10) monthly payments; and (11) college graduate. A single output is generated which classifies people into types of risk groups.

Each input and output variable is put into a column of the spreadsheet. Variables can share columns as long as they are separated by at least one row. The list of columns does not have to be continuous. This is a distinct advantage over those systems which would require the use of spreadsheet data in a specified format.

All number variables are mapped into a 0 to 1 domain. The symbolic variables (Yes or No) are mapped into numbers. This mapping can be done automatically by the neural network. During this mapping, the symbol with the lowest row number is assigned the highest value. For each subsequent symbol in the table, the value is decreased by 1. Alternatively, mapping may be performed using a process wherein blank rows are used to scale the difference in the numbers assigned to each value. The last two rows for each variable contain special data. For numerical variables, the last two rows contain real world minimum and maximum values. For symbolic fields, the last two rows contain the symbol type (either linear or advanced) and a range name.

The range of the symbol table is two columns wide. The first column of this range contains all possible symbols in a logical order. The second column contains the mapping numbers which are generated by the training functions.

After declaring all symbol ranges within the spreadsheet, the system is ready to train. In this case, 17 training patterns to a 5% error may be executed. When training has been completed, the system may be stored in the computer's memory or saved to disk. To make the system usable, the user should output the header columns used during training as well as the formula in the ratio column to an unused part of the spreadsheet.

Next, the user creates the rule-based preprocessor for the network. The preprocessor is a series of if-then statements that test the inputs. If the inputs fail one of the tests, a warning may be displayed and the application not processed. Of course, if the inputs pass all the tests, the application may be processed. A single rule could be testing the monthly payments and the own/rent status. If the person rents and his payments are less than $500.00 a month, then a warning is generated. Any number of rules can be defined. When all of the preprocessing rules have been executed, the inputs can be passed through the network to obtain an output.

Prior to obtaining the output, the trained weights of the neuron network can be loaded into the memory using suitable commands. The output may be used by a procedural post processor. In this case, the post-processor may display a screen of additional information designed to tell a loan officer or other user what to do next. After post processing has been completed, the next loan application can be processed.

The foregoing example shows how easy it is to build a powerful expert system.

It is apparent that there has been provided in accordance with this invention a neural network spreadsheet which fully satisfies the objects, means, and advantages set forth hereinafter. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for incorporating a neural network into an application program and using said network, said method comprising:
   providing an applications program in which information is stored;
   embedding a neural network in said applications program using said stored information;
   said embedding step comprising allocating unused memory in said applications program and creating a neural network engine and an application interface structure from said allocated unused memory; and
   training said neural network utilizing variable numeric and symbolic data stored within said applications program, said training step including preparing said numeric variable data by storing in said interface structure for each numerical variable, a maximum possible value, a minimum possible value, a column location, a starting row location, information on the type of variable and a desired number of training patterns.

2. The method of claim 1 wherein said training step further includes:
   preparing said variable symbolic data by storing in said interface structure for each piece of symbolic data, an address for the variable's symbol table, a symbol type, a column location, a starting row location, information on the type of variable and said desired number of training patterns;
   assigning a numerical value to each symbol in said table; and
   storing the numerical value of the first symbol and the last symbol in the interface structure as the minimum and maximum.

3. The method of claim 2 wherein said training step further comprises:
   (a) scaling all data to values between 0.0 and 1.0;
   (b) performing one forward pass and one backward pass through the neural network; and
   (c) repeating steps (a) and (b) for said desired number of training patterns.

4. The method of claim 3 wherein said training step further comprises:
   (d) determining a percent error;
   (e) comparing said percent error with a preset error to terminate training; and
   repeating steps (a), (b), (c), (d), and (e) if said percent error is less than said preset error.

5. The method of claim 1 further comprising:
   recalling said neural network after completion of said training;
   inputting a desired number of inputs and a desired number of outputs; and
   executing a forward pass through said trained neural network.

6. A method according to claim 1 wherein said training step includes updating weights in said neural network by reading values stored within an application memory.

7. A method according to claim 1 further comprising:
   using error rate and outputted weight matrices to implement boosting of said training.

8. A method for incorporating a neural network into an application program and using said network, said method comprising:
   providing an applications program in which information is stored;
   embedding a neural network in said applications program using said stored information;
   said embedding step comprising allocating unused memory in said applications program and creating a neural network engine and an application interface structure from said allocated unused memory;
   training said neural network utilizing variable numeric and symbolic data stored within said applications program; and
   solving any problem of excessive nodes by exporting a table of connection weights for said network using application command language;
   examining said weight table for all connection weights;
   converting connection weights close to zero to zero; and
   importing said weight table with said converted connection weights back to said neural network.

9. A method for incorporating a neural network into an application program and using said network, said method comprising:
   providing an applications program in which information is stored;
   embedding a neural network in said applications program using said stored information;
   said embedding step comprises allocating unused memory in said applications program and creating a neural network engine and an application interface structure from said allocated unused memory;
   training said neural network utilizing variable numeric and symbolic data stored within said applications program;
   recalling said neural network after completion of said training;
   inputting a desired number of inputs and a desired number of outputs;
   executing a forward pass through said trained neural network; and
   said recalling step comprising
     (a) specifying a number of columns;
     (b) storing for each numeric column information about column location, starting row location, number of patterns in the data structure;
     (c) storing for each symbolic column information about column location, starting row location, number of patterns, address of the symbol table in the data structure; and
     (d) substituting in the application program, a symbolic value from the symbolic table with a number assigned to that symbol so that all columns are converted to numeric values.

10. The method of claim 9 further comprising:
scaling all numeric data to a number in the range of 0.0 to 1.0; and
using said scaled data for said forward pass through the neural network so as to produce network outputs in a range of from 0.0 to 1.0.

11. The method of claim 10 further comprising:
converting said outputs into unscaled numeric values; and
converting symbolic data from a numeric form to a symbolic form using an interface code.

12. A method according to claim 9 further comprising automatically repeating said recalling step whenever variable ones of said inputs are changed in an area defined by said interface structure by a user.

13. A method according to claim 9 further comprising automatically repeating said recalling step whenever a change in size of an area defined by the interface structure occurs.

* * * * *